United States Patent [19]

Haschke et al.

[11] 3,962,132

[45] June 8, 1976

[54] PROCESS FOR IMPROVING THE WETTABILITY OF NATURAL OR SYNTHETIC ZEOLITES

[75] Inventors: Heinz Haschke; Gerhard Morlock, both of Grossauheim, Germany

[73] Assignee: Deutsche Gold- und Silber-Scheideanstalt vormals Roessler, Frankfurt am Main, Germany

[22] Filed: Oct. 30, 1974

[21] Appl. No.: 519,322

[30] Foreign Application Priority Data

Oct. 31, 1973 Germany............................ 2354432

[52] U.S. Cl.............................. 252/430; 252/455 Z; 252/179
[51] Int. Cl.².................... B01J 31/04; B01J 29/06; C02B 5/06
[58] Field of Search................ 252/455 Z, 430, 179, 252/DIG. 11, 89

[56] References Cited
UNITED STATES PATENTS

| | | | |
|---|---|---|---|
| 2,213,641 | 9/1940 | Tainton............................ | 252/455 Z |
| 3,852,211 | 12/1974 | Ohren................................ | 252/179 |
| 3,868,336 | 2/1975 | Mazzola et al................ | 252/DIG. 11 |

*Primary Examiner*—Patrick P. Garvin
*Assistant Examiner*—William G. Wright
*Attorney, Agent, or Firm*—Beveridge, DeGrandi, Kline & Lunsford

[57] ABSTRACT

Process for improving the water wettability of natural or synthetic zeolites, said process comprising thoroughly mixing at least one natural zeolite, synthetic zeolite or mixture of natural and synthetic zeolites with an aqueous solution of a treating agent selected from the group consisting of at least one polyelectrolytic polycarboxylic acid, at least one completely or partially neutralized polycarboxylate, or at least one mixture of said polycarboxylic acid and polycarboxylates; wherein said treating agent has at least about 40 basic mole percent carboxyl or carboxylate groups and a mean degree of polymerization (numerical mean) between about 3 and about 5000; said mixing conducted at about 0° to about 100°C for at least about 5 minutes; said aqueous solution employed in a concentration between about 2 and about 800 g polycarboxylic acid or polycarboxylate per liter and in such quantity that it comprises about 0.01 to about 10 parts by weight, related to one part by weight of zeolite, of the polycarboxylic acid or polycarboxylate.

22 Claims, No Drawings

PROCESS FOR IMPROVING THE WETTABILITY OF NATURAL OR SYNTHETIC ZEOLITES

This invention relates to a process for the improvement of the wettability by water of natural and synthetic zeolites.

In a not previously published German patent application with older priority, the use of cation exchange sodiumaluminosilicates of the type of the zeolites was proposed as a phosphate substitute in washing and cleaning, as well as in detergent and purifying agents.

The use of zeolites in relatively large proportions of the the total mixture, for example, in complete substitution of the condensed phosphates used as builders in the customary detergents and cleaning agents, particularly such as pentasodium-triphosphate (= "sodium tripolyphosphate") is however impeded because substitution of the phosphates by zeolites results in cleaning agents becoming difficult to wet. This negative effect is manifested in such a form that the agents after disseminating or rinsing into water remain unwetted for a relatively long time, and possibly keep floating around on the surface of the water (sawdust effect).

As the result of that, on the one hand a delayed activity of such detergents and cleaning agents occurs, i.e., especially when used in automatic washing machines where the full time available in the washing cycle is not utilized. This naturally leads to an apparent reduction of the washing efficiency; above all however, as a result of the "saw dust effect" certain portions of such detergents or cleaning agents on zeolite base might be lost for the washing process because of the fact that they are deposited at the interfaces of liquor, air and the walls of the container for the washing liquid.

In order to make a better use of the known capacity of the zeolites for binding of $Ca^{2+}$- and $Mg^{2+}$-ions in detergent and cleaning formulations low in or free of phosphates, there is therefore a need in the art to improve their wettability by water, therefore to hydrophilize them.

Accordingly, this invention provides a process for the improvement of the wettability of natural or synthetic zeolites. The process comprises treating natural or synthetic zeolites for at least 5 minutes while mixing them thoroughly with an aqueous solution of at least one polyelectrolytic polycarboxylic acid and/or at least one partially or wholly neutralized polycarboxylate having at least 40 basic mole percent carboxyl or carboxylate groups and a mean degree of polymerization (numerical mean) between 3 and 5,000, at temperatures between 0° and 100°C. The aqueous solution is used at a concentration of between about 2 and about 800 g polycarboxylic acid or polycarboxylate per liter, and in such a quantity that the aqueous solution contains about 0.01 to about 10 parts by weight, related to one part by weight of zeolite, of polycarboxylic acid or polycarboxylate. Optionally, the resulting hydrophilized zeolites are separated in a known manner from the aqueous phase. In another embodiment, the hydrophilized zeolites are dried.

This invention also provides a synthetic or natural zeolite having improved wettability by water by virtue of treatment according to the process of this invention.

Additionally, this invention provides for the use of zeolites, treated according to this invention, in detergent and cleaning compositions.

If the process is carried out in such a way, that drying is accomplished right from the aqueous phase (without preceding separation), the treatment of the zeolites with polyelectrolytes can be continued even to values of the weight ratio polyelectrolyte: zeolite, which lie far above the value of the pertinent adsorption/desorption equilibrium. For this purpose spray drying is particularly preferred.

In the process according to this invention, an adsorption/desorption state can be considered as sufficient when the zeolite is charged with at least about 1 part by weight, preferably at least about 3 parts by weight, especially at least about 5 parts by weight of polyelectrolyte per 100 parts by weight of zeolite. The state of loading of such a hydrophilized zeolite can be measured by finding the loss at red heat after drying of the zeolite.

The loading of the zeolites accomplished according to the process of this invention for zeolite hydrophilization can be carried on logically up to loadings of at most about 200 parts by weight, preferably at most about 100 parts by weight, especially at most about 50 parts by weight of polyelectrolyte per 100 parts by weight zeolite.

The process of this invention can be applied to all natural or synthetic aluminosilicates of the zeolite type. These compounds are described in detail in R. F. Gould "Molecular Sieve Zeolites - I", Advances in Chemistry Series 101, American Chemical Society, Washington, D.C., 1971. Particularly important representatives are the zeolites of the so-called A-type, therefore synthetic zeolites of the Na-Al-silicate type of the formal chemical formula (idealized): $Na_{12}[(AlO_2)_{12}(SiO_2)_{12}] \cdot x\ H_2O$, or put differently, $Na_2O: Al_2O_3:SiO_2 \approx 1:1:2$ with $AlO_2:SiO_2$ - ratios about 12:12, i.e., put precisely between 1:0.5 to 1:2.5, especially between 1:0.8 to 1:1.5 (cf. R. F. Gould, loc. cit., pp. 10 and 12 as well as 22 and 23). The $Na_2O:SiO_2$ ratios of these zeolites lie between about 0.2 and 2.0 (cf. German Pat. No. 1,038,017).

Effectively, the zeolites are subjected to the treatment according to the process of the invention in powder form, i.e., particles having average particle diameters between about 0.1 and 100, preferably between 1 and 20, especially between 1 and 10 μm. It will be apparent that a good, thorough mixing accelerates the adjustment of a sufficient adsorption/desorption state, which can go up to the complete adsorption/desorption equilibrium. Effectively, treatment therefore is carried out with vigorous stirring in a vessel equipped with agitation or in a spray mist mixer.

Synthetic zeolites can also be subjected to treatment according to the process of this invention even without previous isolation, therefore, in the form of a suspension in the mother liquor from their production.

The treatment is accomplished with the aqueous solution of at least one polyelectrolytic polycarboxylic acid, at least one wholly or partially neutralized polycarboxylate, or mixtures of such polycarboxylic acids and polycarboxylates. The content of carboxyl or carboxylate groups in the polycarboxylic acid or in the polycarboxylate is to amount to at least about 40, preferably at least about 50, especially at least about 60 basic mole percent. The average degree of polymerization (numerical mean) of the polyelectrolyte is between 3 and 5000, preferably between about 3 and about 300, especially between about 3 and about 100.

Generally, the treatment can be carried out with good success at temperatures between about 0° and about 100°, preferably about 15° and about 95°, especially between about 20° and about 50°C.

Between the zeolite and the aqueous polyelectrolyte solution, a sufficient adsorption/desorption state appears within a relatively short time. The treatment according to the process of the invention therefore, generally only requires a minimum time of about 5 to about 30 minutes, until the aqueous phase is separated or the entire suspension is dried.

The aqueous polyelectrolyte solution is used at a concentration between about 2 and about 800, preferably between about 5 and about 500, especially between about 15 and about 400 g per liter, and can be used in such a quantity that the polyelectrolyte content amounts to about 0.01 to about 10, preferably about 0.03 to about 2, especially about 0.05 to about 1 part by weight per part by weight zeolite.

The quantity of electrolyte absorbed by the zeolites in the treatment according to the process of this invention naturally depends to a certain degree on its composition, especially on its content of carboxyl or carboxylate groups. To whit, the higher the content of carboxyl or carboxylate groups, the more electrolyte will be absorbed. Generally, the zeolite absorbs at most about 5 to about 25 parts by weight of polyelectrolyte per 100 parts by weight of zeolite, whereby the content of the polyelectrolyte solution used plays only a subordinate role.

Suitable polyelectrolytes for the process of the invention are all polycarboxylic acids and their complete or partial salts with an alkali metal or with ammonia, insofar as they satisfy the above mentioned requirements concerning the content of the carboxyl or carboxylate groups and mean degree of polymerization. Examples are polyacrylic acids, polymethacrylic acids, polymaleic acids, polyitaconic acids, polycitraconic acids, polyglutaconic acids, polymesaconic acids, polyhydroxyacrylic acids, copolymerizates of from 50 to 99 basic mole percent maleic acid units and 50 to 1 basic mole percent styrene⁻, alkylene⁻, (f. ex., ethylene⁻ or propylene⁻), vinyl alkyl ether (alkyl = $CH_3$ to $C_4H_9$)⁻, vinyl acetate - or vinyl alcohol-units. Other suitable copolymerizates are made from 50 to 99 mole % maleic acid and 50 to 1 mole % carbon monoxide, acrylic acid or methacrylic acid.

Preferably, however, the poly (aldehydocarboxylates) and/or poly (hydroxyaldehydocarboxylates) and/or poly (hydroxycarboxylates) described in German Pat. applications Nos. 1,904,940; 1,904,941; and 1,942,556, laid open to public inspection, are used. Of these, the especially preferred ones are those which have a mean degree of polymerization (mean viscosity) between 3 and 600, preferably between 3 and 300, and a minimum carboxyl content of 60 basic mole %.

The preferred carboxylates are polymers, which contain overwhelmingly, C - C bonds in the main chain and are built up exclusively from Y + W/2 basic mole % units of the formula

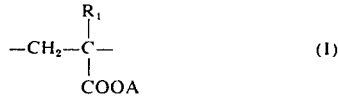

U - W basic mole % units of the formula

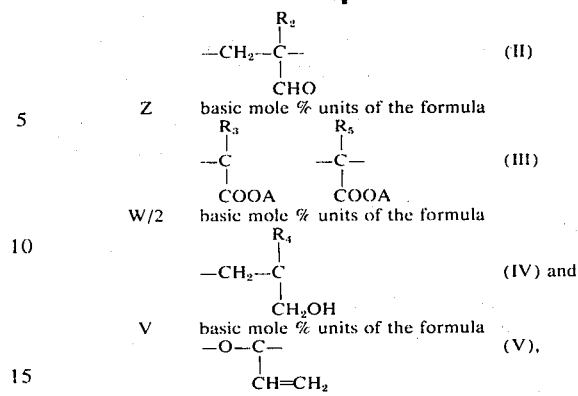

whereby U equals about 12 to about 47, V equals about 0 to about 25, W equals about 0 to about U, Y equals 100 - (U + V + Z) and Z equals about 0 to about 20; A stands for an alkali metal, hydrogen or ammonium ion; $R_1$ signifies hydrogen, methyl, hydroxymethyl, ethyl, chlorine or bromine; $R_2$ and $R_4$ are the same or different and signify hydrogen or hydroxymethyl; $R_3$ and $R_5$ are the same or different and signify hydrogen, methyl or ethyl; and whereby as boundary conditions it must be fulfilled that when W is larger than 0.3.U, the quotient of basic mole % carboxyl or carboxylate groups to basic mole % hydroxyl groups lies between about 1 and about 10.

The mean degree of polymerization of the polymers lies between about 3 and about 600, preferably between about 3 and about 300, especially between about 5 and about 100. The data concerning the mean degree of polymerization are to be understood in such a way that their values of 3, 5, 100, 300, or 600, respectively, correspond to reduced viscosities measured on 1% solutions of free poly (aldehydocarboxylic acids), or for the poly (hydroxycarboxylates) and poly (hydroxyaldehydocarboxylates) measured on the poly (aldehydocarboxylic acids) constituting the base of the former as intermediate products, of 0.023, 0.033, 0.095, 0.200, or 0.350 deciliters per gram, whereby the free poly (aldehydocarboxylic acids) for the preparation of 1 % poly (aldehydocarboxylic acid) solutions required for measurement are doused first with corresponding quantities of 5 % aqueous $SO_2$ solutions and then after complete dissolution has occured, refilled with the same volume of 10%, aqueous NaCl solutions. The viscosimetric measurement is made at 20°C.

The units with the general formulas (I) to (V) of the polymers used in the process of this invention are stated in basic mole % according to E. Trommstorff; i.e., as the median number of the respective formula units per 100 formula units (I) to (V) in the polymer molecules.

For the parameters (U, V, W, Y and Z), which define the portions of the units with the general formulas (I) to (V) in the polymers, it is valid that U equals about 12 to about 47, preferably about 20 to about 47, especially about 22 to about 47; V equals 0 to about 25, preferably about 1 to about 20, especially about 5 to about 15; W is equal to 0 to about U, preferably about 0.3.U to about U, especially about 0.5.U to about U; Y equals 100 - (U + V + Z) and Z equals 0 to about 20, preferably 0 to about 10, especially 0.

For such polymers in which W is greater than 0.3.U, which therefore contain a noticeable number of units of the general formula (IV), the border condition must also be fulfilled that the quotient of basic mole % carboxyl or carboxylate groups to basic mole % hydroxyl groups is between about 2 and about 10, preferably between about 3 and about 9, especially between about 5 and about 8.

The poly (hydroxy carboxylates), i.e., polymers for which W practically equals U, which therefore have no or at most a very small portion of units of the general formula (II), are particularly preferred.

The production of the polymers employed in the process of this invention takes place in a known manner. Thus, the poly (aldehydocarboxylates) can be produced particularly favorably by oxidative polymerization of acrolein, or by oxidative copolymerization of acrolein, possibly for the control of the distribution of the molecular weight in the presence of mercaptans, especially n-dodecylmercaptan and/or thioethyleneglycol, with acrylic acid, methacrylic acid, $\alpha$-chloroacrylic acid or $\alpha$-bromoacrylic acid, or by oxidative terpolymerization of acrolein with the mentioned alpha, beta-unsaturated monocarboxylic acids and with an alpha, beta-unsaturated dicarboxylic acid, optionally substituted by methyl groups or ethyl groups. At the same time, the polymerization conditions must, however, be selected such that the proportions in the polymer of units of the general formulas (I), (II), (III) and (V) lie within the stated ranges and the required degree of polymerization is maintained. In this case, peroxides or peracids can be employed as oxidation agents and at the same time as polymerization initiators. Preferably $H_2O_2$ is used. The COOH- and CO-content of the polymers can be adjusted during the oxidative polymerization by the quantity of, f. ex., acrolein, acrylic acid and oxidation agent employed. Since the peroxide acts at the same time as a regulator, the degree of polymerization can also be influenced by its concentration or predetermined quantity in relation to the monomer.

The polymer can comprise hydroxyl groups, carboxyl, carbonyl, $CH_2OH$- and half acetalic groups of the type:

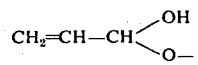
(VIa)

as well as vinyl groups or else hydrogen atoms, f. ex., in the form of groups of the type:

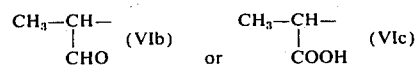

as well as radicals of the catalyst employed. The homo- or coolymerization of the acrolein can be carried out in dependence on the desired content of carboxyl groups in polymers both as a solution as well as a precipitating polymerization, preferably in an aqueous medium. When peroxide compounds are employed as oxidation agents it is recommended to put these and possibly the comonomer or a part of it in an aqueous solution or suspension, and to add the acrolein, possibly mixed with the remaining comonomers at an elevated temperature of, for example, 50° to 100°C. In case of a solution polymerization, the polymers obtained, possibly after concentration of the solution, can be used directly for further reactions. In this case it will often be favorable to neutralize any quantities of oxidation agent still present in the solution by the addition of small quantities of $MnO_2$ or activated charcoal. But it is also possible to precipitate these solution polymers from the reaction mixture with the help of a dilute acid, for example, hydrochloric acid. Residual monomer can be recovered, for example, by distillation directly from the reaction mixture. In that case, the distillation residue represents a highly concentrated aqueous solution of the polymer, which is necessary can be fed to additional reactions. However, the distillation can also be carried out to dryness, and in that case one will obtain the pure polymer in solid form. During execution of a precipitating polymerization, the polymers can easily be separated by filtration. The residual monomers are then contained in the filtrate, and can be used further in this form. The precipitated polymer can be purified with water, and possibly while passing air through.

The units of the type (II) can also be present in the poly (aldehydocarboxylates) in a wholly or partly hydratized form or, because of reactions with the adjacent groups, in the form of cyclic structures, so that cyclic, acetalic, and also acylalic structures are present:

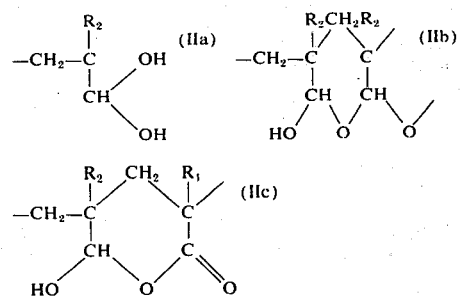

These special structures, since they are related by way of easily reversible equilibrium with the simple, open carbonyl structures (II), are of no special importance.

By neutralization of the poly (aldehydocarboxylic acids) produced according to the mentioned process with an alkali hydroxide or with ammonia, one will obtain the corresponding poly (aldehydocarboxylates), wherein A might have the remaining previously mentioned meanings other than H.

The production of the poly (hydroxyaldehydo carboxylates) and poly (hydroxy carboxylates) employed in this invention also takes place in a known manner. However, particularly preferred are polymers produced by oxidative polymerization of acrolein or oxidative copolymerization of acrolein to the previously described poly (aldehydocarboxylates), and subsequent treatment of the polymerizates with a strong base, especially an alkali metal hydroxide, according to Cannizzaro. The treatment with a strong base can also take place with simultaneous condensation with formaldehyde. One will then obtain polymers which additionally have units of the formulas:

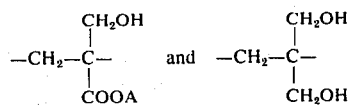

These units correspond to the general formulas (I) and (IV) whenever $R_1$ and $R_4$ are hydroxymethyl. Whenever the treatment of the poly (aldehydocarboxylates) with a strong base according to Cannizzaro is continued to complete conversion of all originally present units of the general formula (II), then poly (hydroxycarboxylates) result. Whenever it is carried out only up to a partial conversion, then poly (hydroxyaldehydocarboxylates) result.

The poly (aldehydocarboxylic acids) first obtained can be reacted in an aqueous solution or suspension with a strong base, optionally in the presence of formaldehyde. In this case, one can proceed in such a way that the formaldehyde is employed in about stoichiometric quantities in relation to the aldehydogroups present in the polymer. The reaction mixture is stirred for some time at ambient temperature or at elevated temperatures up to about 100°C, preferably at 20 to 60°C, while gradually adding alkali. After two hours, the conversion can, for example, already be 60 to 70% of the theoretically complete conversion, and within 4 to 24 hours it can rise to 90 to 100% of the theoretically complete conversion. In case of reaction in solution one will obtain solutions which beside the salts of the poly (hydroxyaldehydocarboxylic acids) or poly (hydroxy carboxylic acids) contain an excess of alkali. After neutralization they can be evaporated to dryness. By precipitation from the reaction mixture for example with methanol, the salts are obtained in a particularly pure form. But it is also possible to neutralize the solution prior to concentration with a dilute acid, for example, hydrochloric acid, or preferably formic acid, sulfuric acid or phosphoric acid, or to precipitate the free acids.

Neutralization of excess alkali can taken place effectively only by means of such acids, the salts of which do not disturb in the later use of the polymers. For this, for example, the use of carbon dioxide, hydrochloric acid, sulfuric acid, phosphoric acid, formic acid, acetic acid, citric acid, fatty acids or aliphatic or aromatic sulfonic acids is recommended. However, it is advantageous to use for this the poly (hydroxyaldehydo carboxylic acids) or poly (hydroxycarboxylic acids) themselves in a pure, solid form or in solution. According to a particularly preferred variation, the poly (aldehydocarboxylic acids) obtained as an intermediate product in the above mentioned reaction, and of this preferably the easily water soluble types in aqueous solution or in solid form, or else citric acid or fatty acids or aliphatic or aromatic sulfonic acids are employed for neutralization. In this way one will obtain neutral solutions of the salts of the poly (hydroxyaldehydocarboxylic acids) or poly (hydroxycarboxylic acids), which are to be used directly. In the main chains they mainly have C-C bonds. They can be in a straight line or else slightly cross-linked. The polymers are built up of at least two of the above mentioned units (I) to (V). These units are developed partly during treatment of the poly (aldehydocarboxylic acids) according to the Cannizzaro reaction. During this treatment, intermolecular aldol-condensations can occur between the active CH-group in alpha position in relation to the aldehydo groups in the poly (aldehydocarboxylic acids) and carbonyl groups of one or more adjacent chains. This results in cross linkages.

If one also uses comonomers beside acrolein and, for example, acrylic acid, such as, for example, maleic acid, units (III) are also present in the main chain of the polymer in a subordinate number. Their quantity can amount to up to 20 basic mole %. The water solubility and/or acidity, and thus the general usability of the polymers can be controlled by them.

Whenever the conversion of the poly (aldehydocarboxylates) is carried out with strong bases according to Cannizzaro in the presence of formaldehyde, then units of the general formulas (I) and (IV) develop, in which $R_1$ or $R_4$ represent hydroxy methyl groups, whereby the degree of cross-linking can be controlled by the quantity of aldehyde used.

Although the oxidative polymerization or copolymerization of acrolein is a radical polymerization, units of the general formula (V) can nevertheless be present in subordinate quantities up to 25 basic mole % in the main chains of the poly (aldehydocarboxylates) and also of the poly (hydroxyaldehydocarboxylates) or poly (hydroxycarboxylates) produced from them by Cannizzaro reaction. They develop by polymerization under opening of the carbonyl double bond of the acrolein. However, they are of no special importance for use according to this invention.

The end groups present in the polymer, which develop in dependence on the reaction conditions and the reaction medium, are also practically without significance. If one starts out with acrolein and $H_2O_2$, at least one of the two end groups of the poly (hydroxycarboxylates) or of the poly (hydroxyaldehydo carboxylates) is practically always a hydroxyl group. In all other cases, $CHO^-$, $CH_2OH^-$, $COOH^-$, or $CH_2=CH^-$ groups or hydrogen atoms, as well as radicals of the catalysts used, may appear as end groups.

The corresponding partial salts of the poly (aldehydocarboxylic acid), poly (hydroxyaldehydo carboxylic acid) or poly (hydroxycarboxylic acid), therefore the compounds representing the so-called "hydrogen salts", can also be used to advantage in case of the process of this invention.

The zeolites hydrophilized by the treatment of the invention can, insofar as their presence is not disturbing, be processed further together with excess polyelectrolyte solution. Since zeolites, on the basis of their ability to complex $Ca^{2+}$- and $Mg^{2+}$-ions, i.e., the typical water hardness formers, are suitable as water softeners or as builders for detergents or cleaning agents, they can be mixed, for example, immediately together with the excess polyelectrolyte solution with customary components of detergents and cleaning agents, to form a slurry which is subsequently converted by known processes into a dry, powdery product.

The hydrophilized zeolites, however, can also be separated from the excess polyelectrolyte solution in a known manner, for example, by decanting, filtration, or centrifuging. Then, depending on the requirements, they can be used further either in a moist state or else after being dried by means of known processes and apparatuses.

As a result of treatment according to the process of this invention, the wettability of the zeolites by means of water is surprisingly improved quite considerably. Only this hydrophilation makes it possible therefore, to make use of zeolites in a relatively large proportion of the total mix in detergents and cleaning agents without any need for fearing interference during the washing process. This is particularly true for their use as builders, as a result of which the condensed phosphates customarily serving as builders can be replaced entirely or partly by environmentally compatible substances.

The improved wettability of zeolites by water which had been achieved through treatment according to the process of this invention will be illustrated in the following examples and comparative experiments. All parts, proportions, ratios and percentages are by weight unless otherwise indicated.

Production of the Zeolites Used in the Examples

Zeolite A - No: 1

500 g of a solution containing 0.325 moles $Na_2O$ and 0.24 moles $Al_2O_3$ are added to a 1 liter round bottom flask with mechanical paddle agitator. Sodiumaluminosilicate is precipitated in an exothermal reaction with vigorous stirring from this mix by addition of 270 g of a solution containing 0.34 moles $Na_2O$ and 1.17 moles $SiO_2$. After precipitation, the product is subjected to crystallization at 80°C for 6 hours. A partly crystalline zeolite of the following specification is obtained:

$Na_2O : SiO_2 = 0.2\ Al_2O_3 : SiO_2 = 1:2.5$

Zeolite A - No: 2

620 g of a solution containing 0.67 moles $Na_2O$ and 0.16 moles $Al_2O_3$ is added to a 1 liter round botttom flask with mechanical paddle agitator. Sodiumaluminosilicate is precipitated in an exothermal reaction from this mix, under vigorous stirring, by addition of 135 g of a solution containing 0.08 moles $Na_2O$ and 0.49 moles $SiO_2$. After precipitation, the product is subjected to crystallization at 80°C for 24 hours. A crystalline zeolite A of the following specification is obtained:

$Na_2O : SiO_2 = 0.3\ Al_2O_3 : SiO_2 = 1:1.325$

Zeolite A - No: 3

650 g of a solution containing 0.33 moles sodium aluminate ($NaAlO_2$) is added to a 1 liter round bottom flask with mechanical paddle agitator. Sodiumaluminosilicate is precipitated from this mix, while stirring vigorously by addition of 0.36 moles $Na_2O$ (as NaOH) followed by 65 ml of a solution containing 0.078 moles $Na_2O$ and 0.28 moles $SiO_2$. After precipitation, the product is subjected to crystallization at 100°C (reflux cooler) for 66 hours. A crystalline zeolite A of the following specification is obtained:

$Na_2O : SiO_2 = 2.0\ Al_2O_3 : SiO_2 = 1:1$

Zeolite A - No: 4

650 g of a solution of 0.33 moles sodium aluminate ($NaAlO_2$) are added to a 1 liter round bottom flask with a mechanical paddle agitator. Sodiumaluminosilicate is precipitated from this under vigorous stirring by the addition of a silica gel suspension containing 0.41 moles $SiO_2$ and dilution with distilled water until the mixture has a pH of 13.5. The product is subjected to crystallization at 100°C for 92 hours (reflux cooler). A crystalline zeolite A of the following specification is obtained:

$Na_2O : SiO_2 = 0.50\ Al_2O_3 : SiO_2 = 1:1$

This zeolite corresponds to a zeolite A of ideal composition.

Zeolite A - No: 5

30 g of silicic acid gel are reacted with 41 g sodium aluminate ($NaAlO_2$) in a dilute aqueous solution (or suspension) in a round bottom flask with mechanical paddle agitator. The volume of water for dilution is chosen such that the pH of the mixture is 13.5 measured electrometrically. The sodiumaluminosilicate precipitated during the reaction is subjected to crystallization at 100°C for 92 hours. A crystalline zeolite A of the following specification is obtained:

$Na_2O : SiO_2 = 0.56\ Al_2O_2 : SiO_2 = 1:0.9$

Zeolite A - No: 6

430 g of a solution containing 0.66 moles sodium aluminate ($NaAlO_2$) are added to a 1 liter round bottom flask with mechanical paddle agitator. The sodiumaluminosilicate is precipitated from this under vigorous stirring by the addition of 120 g of a solution containing 0.14 moles $Na_2O$ and 0.51 moles $SiO_2$. The product is subjected to crystallization at 100°C for 62 hours. A crystalline zeolite A of the following specification is obtained:

$Na_2O : SiO_2 = 0.95\ AlO_2 : SiO_2 = 1:0.84$

Comparative Experiment 1

The "wettability of a non-hydrophilized standard zeolite (type A)" is determined as the average of the results of wettability experiments with the zeolite samples zeolite A - No. 1 to zeolite A - No. 6.

For this purpose, the following wettability method is employed:

In 7 crystallizing dishes made of glass (diameter 18.5 cm, height 8.5 cm) always 500 ml of distilled water are added. Then a 42 mm long magnetic stirring rod is inserted into the dishes. Subsequently, the heating or thermostating of the water in the dishes takes place at a temperature of 40°C. Every such dish, containing 500 ml 40° water - one after the other - is now placed on a magnetic stirring device for the measurement of the wettability of the powder, the magnetic stirring of which is adjusted precisely to 100 r.p.m. (with the dish set up). Then always precisely 2.5 g of powder are strewn into the water preparation stirred constantly at 100 r.p.m. from a fixedly mounted aluminum shaking trough driven by an electric vibrator. The vibrator or the slope of the aluminum trough are at the same time set in such a way that the powder - after having been put in at the same place at the upper end of the shaking trough - is strewn into the water preparation within 15–17 seconds practically completley precisely into the center of the assumed rotational axis of the magnetic stirring rod, so that a small heap of powder is formed which rotates with the movement of the water produced by the movement of the magnetic stirring rod, and floats on the surface of the water, and which "indents" the surface of the water more or less depending on its wettability because of the boundary angle between the powder particles and the surface of the water. The heap of powder then "dissolves" - depending on its wettability - more or less quickly into individual powder particles genuinely suspended in the water. The time until "dissolution" of the little heaps of powder is taken as the measure for the wettability of the powder.

Naturally, it is not important in this test how long the absolute time differences between the beginning of strewing in and dissolution of the little heaps of powder actually are, since these differ greatly depending on the manner of the execution of the test (i.e. depending on the rotational speed of the agitator, speed of strewing in, etc.); it is important only that the test permits an unequivocal, reproducible differentiation between variously easily wettable powders. The measuring results, therefore, for the evaluation of the increase of the wettability effect are given in a relative scale:

$$\text{relative wettability} = \frac{Z^i \text{dissol.} - x^t \text{dissol}}{Z^i \text{dissol.} - P^i \text{dissol}} \cdot 100$$

The meanings here are
$Z^i$ dissol. = the average "dissolution time" of small heaps of powder of non-hydrophilized zeolites;
$P^i$ dissol. = the "dissolution time" of small heaps of powder of pentasodium triphosphate (sodium polyphosphate = STP) used as reference substance which can be considered a classic detergent builder;
$x^t$ dissol. = The "dissolution time" of small heaps of powder of hydrophilized zeolite.

In the present case the following "dissolution times" for small heaps of powder were measured with the above mentioned zeolite A - samples No's 1 to 6:

| Zeolite A No: | $Z'$ dissol. | remark |
|---|---|---|
| 1 | more than 2 min's. | precipitated* |
| 2 | 65 sec's. | |
| 3 | 45 sec's. | |
| 4 | more than 5 min's. | precipitated |
| 5 | 50 sec's. | |
| 6 | 60 sec's. | |
| | $Z^i$ dissol. = 55 sec's. | |

*Although it seems as though some zeolites are so poorly wettable that powder particles still float on the surface unwetted after a very long test period, in view of a precise scale for the evaluation of the improvement effect in wettability only the relatively favorable "dissolution time" for small heaps of powder were used for the determination of $Z^i$ dissol.

All zeolite samples were predried overnight at 120°C. prior to their use in the drying cabinet.

Comparative Experiment 2

Pure pentasodium triphosphate was examined according to the wettability test described in the comparative experiment 1. After 5 experiments an average value of 29 seconds resulted for the "dissolution time" of the little heaps of powder.

| Experiment | $P'$ dissol. |
|---|---|
| 1 | 27 sec. |
| 2 | 30 sec. |
| 3 | 30 sec. |
| 4 | 28 sec. |
| 5 | 30 sec. |
| | $P^i$ dissol. = 29 sec's. |

EXAMPLE 1:

Always 20 g of zeolite A per 100 g solution are suspended in a 5% by weight aqueous solution of a poly (aldehydocarboxylate) at 23°C produced by oxidative copolymerization of 20 mole % acrylic acid with 80 mole % acrolein in aqueous hydrogen peroxide, followed by a reaction with sodium hydroxide according to Cannizzaro, characterized by the parameters: U = 17.1; V = 13; W = 15.4; Y = 69.9 and Z = 0, corresponding to a carboxyl or carboxylate to hydroxyl ratio (inclusive of the terminal groups) of about 5.1 and a degree of neutralization of $$\alpha N = \frac{COO^-}{COO^- + COOH} = 0.88,$$

with $\bar{P} = 20$ (mean viscosity). The suspension is mixed thoroughly with a paddle agitator for 30 minutes, then the aqueous phase is separated by filtration. The solid filter residue is absorbed in distilled water, mixed thoroughly, and then separated once more after this washing process by filtration from the aqueous phase. it is dried at 120°C in a vacuum dryer (12 mm Hg). After that the dry zeolite is ground in a disk mill and used for the wettability test. The determination of loss at red heat on the poly (hydroxycarboxylate)-laden zeolite results in a polyelectrolyte content of P %;

| Zeolite A | P | rel. wettability |
|---|---|---|
| No: 1 | 5 % | 96 % |
| No: 2 | 3 % | 89 % |
| No: 3 | 7 % | 96 % |
| No: 4 | 6 % | 97 % |
| No: 5 | 2 % | 75 % |
| No: 6 | 2 % | 77 % |

EXAMPLE 2:

Always 30 g zeolite A per 100 g solution are suspended at 25°C in a 10% by weight aqueous solution of a poly (hydroxycarboxylate) produced by oxidative copolymerization of 20 mole % acrylic acid with 80 mole % acrolein in aqueous hydrogen peroxide, followed by a reaction with sodium hydroxide according to Cannizzaro, characterized by the parameters: U = 17; V = 13; W = 17; Y = 70 and Z = 0, corresponding to a carboxyl or carboxylate to hydroxyl ratio (inclusive of terminal groups) of about 4.9 and a degree of neutralization of about 0.88 with $\bar{P} = 20$ (mean viscosity). The suspension is mixed thoroughly with a paddle agitator for 30 minutes, then it is separated from the aqueous phase by filtration, rewashed twice with distilled water, and finally dried overnight at 120°C in a vacuum dryer. The determination of loss at red heat on the ground poly (hydroxycarboxylate)- laden zeolite results in a polyelectrolyte content of P %.

| Zeolite A | P | rel. wettability |
|---|---|---|
| No: 1 | 15 % | 98 % |
| No: 2 | 12 % | 96 % |
| No: 3 | 10 % | 97 % |
| No: 4 | 17 % | 95 % |
| No: 5 | 9 % | 97 % |
| No: 6 | 14 % | 95 % |

EXAMPLE 3:

25 g zeolite A per 100 g solution are suspended at 40°C in a 40% by weight aqueous solution of a poly (hydroxycarboxylate) produced by oxidative copolymerization of 50 mole % acrylic acid and 50 mole % acrolein in aqueous hydrogen peroxide, followed by a reaction with sodium hydroxide according to Cannizzaro. The polymer is characterized by the parameters: U = 16; V = 6; W = 15; Y = 78; Z = 0 corresponding to a carboxyl or a carboxylate to hydroxyl ratio (inclusive) of the end groups) of 8.55 and a degree of neutralization of 0.87 with a medium degree of polymerization of 60 (mean viscosity). The suspsension is thoroughly mixed with a paddle agitator for 15 minutes, then it is centrifuged off. The pasty zeolite phase is immediately dried in the vacuum (15 mm Hg) at 120°C. After grinding in a disk mill, the dry product is subjected to determination of loss at red heat or to the wettability test. The determination of loss at red heat produced a polyelectrolyte charge of the zeolite of P %:

| Zeolite A | P | rel. wettability |
| --- | --- | --- |
| No: 1 | 43 % | 77 % |
| No: 2 | 40 % | 78 % |
| No: 3 | 45 % | 79 % |
| No: 4 | 57 % | 66 % |
| No: 5 | 54 % | 81 % |
| No: 6 | 47 % | 80 % |

EXAMPLE 4:

A 30% by weight poly (aldehydocarboxylic acid) solution is poured while stirring into a 30% by weight zeolite suspension (pH = 13.7) and to be sure corresponding to 3.7% by weight of poly (aldehydocarboxylic acid) in the polyelectrolyte - zeolite mixture. The poly (aldehydocarboxylic acid) was produced by oxidative copolymerization of 50 mole % acrylic acid with 50 mole % acrolein in aqueous hydrogen peroxide, and is characterized by the parameters: $U = 18$; $V = 1$; $W - 0$; $Y = 81$; $Z = 0$ with a medium degree of polymerization of 75 (mean viscosity). After addition of the poly (aldehydocarboxylic acid), the zeolite suspension (the mother liquor after production of the zeolite was used as such) has a pH of 11.5. Subsequently, still under continued stirring and likewise at 27°C, a 40% by weight poly (hydroxycarboxylic acid) - Na⁻ salt solution is added, and to be sure so much that altogether a quantity of polycarboxylate corresponding to 5% polycarboxylate mixed with 95% zeolite is present in the mixture. This poly (hydroxycarboxylate) was produced from the above-mentioned poly (aldehydocarboxylic acid) by reaction with sodium hydroxide solution in the presence of formaldehyde, and was characterized by the parameters: $U = 18$; $V = 1$; $W = 15$; $Y = 81$; $Z = 0$, corresponding to a carboxyl or a carboxylate relationship to hydroxyl (including end groups) of 3.6 and a degree of neutralization of 0.95 [$R_4 = CH_2OH$; in the units of the formula (I), present at 88.5 basic mole %, for 81 basic mole % $R_1 = H$ and for the remaining 7.5 basic mole % $R_1 = CH_2OH$]. The zeolite suspension obtained has a pH = 10.8. It is subjected directly to spray drying, and has a polycarboxylate content (according to the method for determination of loss at red heat) of P %:

| Zeolite A | P | rel. wettability |
| --- | --- | --- |
| No: 1 | 5.2 % | 98 % |
| No: 2 | 7.3 % | 95 % |
| No: 3 | 5.5 % | 96 % |
| No: 4 | 6.1 % | 96 % |
| No: 5 | 7.2 % | 98 % |
| No: 6 | 5.8 % | 96 % |

EXAMPLE 5:

A 20% by weight poly (hydroxycarboxylate) solution containing the same poly (hydroxy carboxylate) as in Example 4 is sprayed on a zeolite powder remixed in a plowshare mixer at 25°C, and to be sure as much as corresponded to a 10% priming of the zeolite by polycarboxylate. The sprayed-on zeolite is dried in fromt of a hot air blower, and subsequently and for the sake of safety it is ground like the other product in the pinned disk mill in order to avoid any distortions in the wettability test as a result of the effects of grain sizes. The method of determining loss at red heat showed a polyelectrolyte content of the primed zeolite of P %;

| Zeolite A | P | rel. wettability |
| --- | --- | --- |
| No: 1 | 11.5 % | 98 % |
| No: 2 | 10.7 % | 97 % |
| No: 3 | 12.2 % | 95 % |
| No: 4 | 10.5 % | 97 % |
| No: 5 | 10.2 % | 95 % |
| No: 6 | 10.5 % | 92 % |

EXAMPLE 6:

Analogously to the process in Example 5, a zeolite A powder is produced by spraying it with a 20% by weight aqueous solution of a poly (aldehydocarboxylate), produced by oxidative copolymerization of 50 mole % acrylic acid and 50 mole % acrolein, followed by neutralization with sodium hydroxide solution and characterized by the following parameters: $U = 14$; $V = 6$; $W = 2$; $Y = 80$; $Z = 0$, with a mean degree of polymerization of 60 and a degree of neutralization of 0.75. Sufficient solution is sprayed on so that a 50% priming (5% polyelectrolyte on 95% zeolite) is achieved. The determination of loss at red heat results in a P % polyelectrolyte in the mix with the zeolite in the primed, dried, ground up end product:

| Zeolite A | P | rel. wettability |
| --- | --- | --- |
| No: 1 | 5.3 % | 79 % |
| No: 2 | 5.8 % | 68 % |
| No: 3 | 5.9 % | 71 % |
| No: 4 | 6.2 % | 74 % |
| No: 5 | 4.7 % | 76 % |
| No: 6 | 5.4 % | 71 % |

What is claimed is:
1. Process for improving the water wettability of natural or synthetic zeolites, said process comprising thoroughly mixing at least one natural zeolite, synthetic zeolite or mixture of natural and synthetic zeolites with an aqueous solution of a treating agent selected from the group consisting of at least one polyelectrolytic polycarboxylic acid, at least one completely or partially neutralized polycarboxylate, or at least one mixture of said polycarboxylic acid and polycarboxylate; wherein said treating agent has at least about 40 basic mole percent carboxyl or carboxylate groups and a mean degree of polymerization (numerical mean) between about 3 and about 5000; said mixing conducted at about 0° to about 100°C for at least about 5 minutes; said aqueous solution employed in a concentration between about 2 g and about 800 g polycarboxylic acid or polycarboxylate per liter and in such quantity that it comprises about 0.01 to about 10 parts by weight, related to one part by weight of zeolite, of the polycarboxylic acid or polycarboxylate.

2. Process according to claim 1 in which the resulting hydrophilized zeolite is separated from the aqueous phase.

3. Process according to claim 1 in which the resulting hydrophilized zeolite is dried.

4. Process according to claim 1 in which mixing is conducted in a vessel equipped with an agitator.

5. Process according to claim 1 in which the zeolite is treated with at least about one part by weight polycarboxylate per 100 parts by weight of zeolite.

6. Process according to claim 1 in which the zeolite is treated with up to about 200 parts by weight polycarboxylate per 100 parts by weight of zeolite.

7. Process according to claim 1 in which the zeolite is zeolite A before treatment.

8. Process according to claim 1 in which the zeolite before treatment has a particle size of about 0.1 to about 100 millimicrons.

9. Process according to claim 1 in which the treating agent has at least about 50 basic mole percent carboxyl or carboxylate groups.

10. Process according to claim 1 in which the treating agent has at least about 60 basic mole percent carboxyl or carboxylate groups.

11. Process according to claim 1 in which the degree of polymerization is about 3 to about 300.

12. Process according to claim 1 in which the degree of polymerization is about 3 to about 100.

13. Process according to claim 1 in which mixing is conducted at about 15° to about 95°C.

14. Process according to claim 1 in which mixing is conducted at about 20° to about 50°C.

15. Process according to claim 1 in which the mixing time is about 5 to about 30 minutes.

16. Process according to claim 1 in which the aqueous solution of the treating agent is employed in a concentration between about 5 and about 500 g per liter and in such quantity that it comprises about 0.03 to about 2 parts by weight per part by weight zeolite.

17. Process according to claim 1 in which the aqueous solution of the treating agent is employed in a concentration between about 15 and about 400 g per liter and in such quantity that it comprises about 0.05 to about 1 part by weight per part by weight zeolite.

18. Process according to claim 1 in which previously untreated zeolite absorbs about 5 to about 25 parts by weight of polyelectrolyte per 100 parts by weight of zeolite.

19. Process according to claim 1 in which the polyelectrolyte is a polymer comprising predominantly C - C bonds in the main polymer chain and built up exclusively from:

| | | |
|---|---|---|
| $Y + W/2$ | basic mole % units of the formula $-CH_2-\underset{\underset{COOA}{\|}}{\overset{\overset{R_1}{\|}}{C}}-$ | (I) |
| $U - W$ | basic mole % units of the formula $-CH_2-\underset{\underset{CHO}{\|}}{\overset{\overset{R_2}{\|}}{C}}-$ | (II) |
| $Z$ | basic mole % units of the formula $-\underset{\underset{COOA}{\|}}{\overset{\overset{R_3}{\|}}{C}}- \quad -\underset{\underset{COOA}{\|}}{\overset{\overset{R_5}{\|}}{C}}-$ | (III) |
| $W/2$ | basic mole % units of the formula $-CH_2-\underset{\underset{CH_2OH}{\|}}{\overset{\overset{R_4}{\|}}{C}}-$ | (IV) and |
| $V$ | basic mole % units of the formula $-O-\underset{\underset{CH=CH_2}{\|}}{C}-$ | (V). | whereby U equals about 12 to about 47, V equals about 0 to about 25, W equals about 0 to about U, Y equals $100-(U+V+Z)$ and Z equals about 0 to about 20; A stands for an alkali metal, hydrogen or ammonium ion; $R_1$ signifies hydrogen, methyl, hydroxymethyl, ethyl, chlorine or bromine; $R_2$ and $R_4$ are the same or different and signify hydrogen or hydroxymethyl; $R_3$ and $R_5$ are the same or different and signify hydrogen, methyl or ethyl; and whereby as boundary conditions it must be fulfilled that when W is larger than 0.3.U, the quotient of basic mole % carboxyl or carboxylate groups to basic mole % hydroxyl groups lies between about 1 and about 10.

20. A natural or synthetic zeolite which is wettable by water, said zeolite comprising the product obtained by mixing at least one natural zeolite, synthetic zeolite or mixture of natural and synthetic zeolites with an aqueous solution of a treating agent selected from the group consisting of at least one polyelectrolytic polycarboxylic acid, at least one completely or partially neutralized polycarboxylate or at least one mixture of said polycarboxylic acids and polycarboxylates; wherein said treating agent has at least about 40 basic mole % carboxyl or carboxylate groups and a mean degree of polymerization (numerical mean) between about 3 and about 5000; said mixing conducted at about 0° to about 100°C for at least about 5 minutes; said aqueous solution employed in a concentration of about 2 to about 800 g polycarboxylic acid or polycarboxylate per liter and in such quantity that the aqueous solution comprises about 0.01 to about 10 parts by weight, related to 1 part by weight of zeolite, polycarboxylic acid or polycarboxylate.

21. Zeolite according to claim 20 wherein said zeolite is zeolite A before treatment.

22. Zeolite according to claim 20 wherein said treating agent is a polymer comprised mainly of C - C bonds in the main chain and built up exclusively from:

| | | |
|---|---|---|
| $Y + W/2$ | basic mole % units of the formula $-CH_2-\underset{\underset{COOA}{\|}}{\overset{\overset{R_1}{\|}}{C}}-$ | (I) |
| $U - W$ | basic mole % units of the formula $-CH_2-\underset{\underset{CHO}{\|}}{\overset{\overset{R_2}{\|}}{C}}-$ | (II) |
| $Z$ | basic mole % units of the formula $-\underset{\underset{COOA}{\|}}{\overset{\overset{R_3}{\|}}{C}}- \quad -\underset{\underset{COOA}{\|}}{\overset{\overset{R_5}{\|}}{C}}-$ | (III) |
| $W/2$ | basic mole % units of the formula $-CH_2-\underset{\underset{CH_2OH}{\|}}{\overset{\overset{R_4}{\|}}{C}}-$ | (IV) and |
| $V$ | basic mole % units of the formula $-O-\underset{\underset{CH=CH_2}{\|}}{C}-$ | (V), | whereby U equals about 12 to about 47, V equals about 0 to about 25, W equals about 0 to about U, Y equals 100−(U + V + Z) and Z equals about 0 to about 20; A stands for an alkali metal, hydrogen or ammonium ion; $R_1$ signifies hydrogen, methyl, hydroxymethyl, ethyl, chlorine or bromine; $R_2$ and $R_4$ are the same or different and signify hydrogen or hydroxymethyl; $R_3$ and $R_5$ are the same or different and signify hydrogen, methyl or ethyl; and whereby as boundary conditions it must be fulfilled that when W is larger than 0.3.U, the quotient of basic mole % carboxyl or carboxylate groups to basic mole % hydroxyl groups lies between about 1 and about 10.

* * * * *